United States Patent
Palat et al.

(10) Patent No.: US 11,792,641 B2
(45) Date of Patent: Oct. 17, 2023

(54) UE CAPABILITY TRANSFER AND STORAGE

(71) Applicant: Apple Inc., Cupertino, CA (US)

(72) Inventors: Sudeep K. Palat, Cheltenham (GB);
Naveen Palle, San Diego, CA (US);
Alexandre Saso Stojanovski, Paris (FR); Youn Hyoung Heo, Seoul (KR);
Richard C. Burbidge, Shrivenham (GB)

(73) Assignee: Apple Inc., Cupertino, CA (US)

( * ) Notice: Subject to any disclaimer, the term of this patent is extended or adjusted under 35 U.S.C. 154(b) by 271 days.

(21) Appl. No.: 17/282,836

(22) PCT Filed: Oct. 11, 2019

(86) PCT No.: PCT/US2019/055880
§ 371 (c)(1),
(2) Date: Apr. 5, 2021

(87) PCT Pub. No.: WO2020/077230
PCT Pub. Date: Apr. 16, 2020

(65) Prior Publication Data
US 2021/0352467 A1 Nov. 11, 2021

Related U.S. Application Data

(60) Provisional application No. 62/744,405, filed on Oct. 11, 2018.

(51) Int. Cl.
*H04W 4/00* (2018.01)
*H04W 8/24* (2009.01)
(Continued)

(52) U.S. Cl.
CPC .............. *H04W 8/24* (2013.01); *H04W 36/08* (2013.01); *H04W 60/04* (2013.01); *H04W 72/51* (2023.01)

(58) Field of Classification Search
CPC ...... H04W 72/51; H04W 63/08; H04W 60/04
See application file for complete search history.

(56) References Cited

U.S. PATENT DOCUMENTS

2019/0313239 A1* 10/2019 Horn ....................... H04W 8/20
2019/0357037 A1* 11/2019 Velev .................... H04W 76/27
2021/0227379 A1* 7/2021 Huang ................. H04W 76/27

OTHER PUBLICATIONS

Samsung, "Solution for Key Issue #2: Provisioning of UE Radio Capability Information", 3GPP SA WG2 #128-bis, S2-187845, Sophia Antipolis, France, Aug. 2018, 4 pgs.
(Continued)

*Primary Examiner* — Justin Y Lee
(74) *Attorney, Agent, or Firm* — Kowert, Hood, Munyon, Rankin & Goetzel, P.C.

(57) ABSTRACT

Systems and methods of providing UE capability are described. A capability ID is associated with the same Radio Capability information for multiple UEs. If the capability ID is validated at a network node, the UE provides the capability ID to a RAN node, which obtains the capability information from the network node after providing the received capability ID to the RAN node. The capability ID is received in an RRC Setup Complete, Security Mode Complete or Reconfiguration Complete message. The network node, if the Radio Capability information is not available, requests and receives the Radio Capability information and associates it with the capability ID, and marks that the capability ID as not validated until a threshold number of the UEs have provided the same Radio Capability information. The capability ID is based on a UE device type, manufacturer and software version.

20 Claims, 5 Drawing Sheets

(51) Int. Cl.
*H04W 36/08* (2009.01)
*H04W 60/04* (2009.01)
*H04W 72/51* (2023.01)

(56) References Cited

OTHER PUBLICATIONS

Mediatek Inc., "UE Capability Compression Through Capability ID", 3GPP TSG-RAN WG2 #102, R2-1807822, Busan, Korea, May 2018, 7 pgs.
Samsung, et al., "Solution 4 Update: Provisioning of UE Radio Capability Information", 3GPP SA WG2 #129, S2-1810303, Dongguan, China, Oct. 2018, 4 pgs.
Oppo, "New Solution for Key Issue 1", 3GPP SA WG2 #129, S2-1810346, Dongguan, China, Oct. 2018, 2 pgs.
Nokia, et al., "Initial Working Assumptions on the "UE Capability ID"", 3GPP TSG-RAN WG2 Meeting #103bis, R2-1814393, Chengdu, China, Oct. 2018, 4 pgs.
International Search Report and Written Opinion for International Application No. PCT/US2019/055880, dated Jan. 28, 2020, 10 pgs.

* cited by examiner

UE CAPABILITY TRANSFER AND STORAGE

This application is a U.S. National Stage filing of International Application No. PCT/US2019/055880, filed Oct. 11, 2019, which claims the benefit of and priority to the U.S. Provisional Application No. 62/744,405, filed Oct. 11, 2018. All of the aforementioned applications are incorporated herein by reference in their entireties.

TECHNICAL FIELD

Embodiments pertain to radio access networks (RANs). Some embodiments relate to cellular networks, including Third Generation Partnership Project (3GPP) Long Term Evolution (LTE), 4th generation (4G) and $5^{th}$ generation (5G) New Radio (NR) (or next generation (NG)) networks. Some embodiments relate to transference of user equipment (UE) capability information to the network.

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, various changes to existing systems are being contemplated to improve network processes. One of the issues exacerbated by the explosion of UEs is the transfer and storage of UE information, including capability information, in the network.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
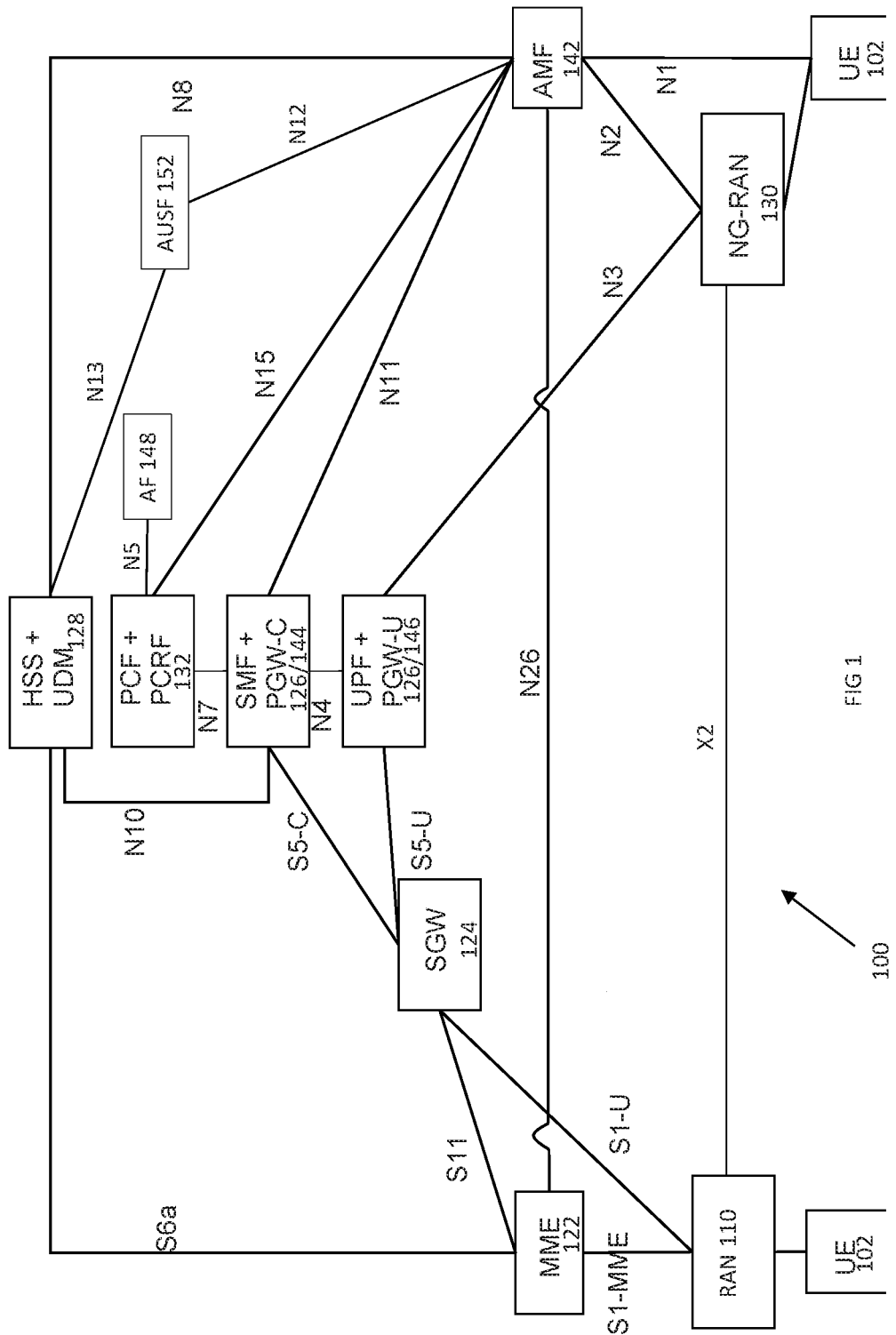
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or radio access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with an SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The POW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
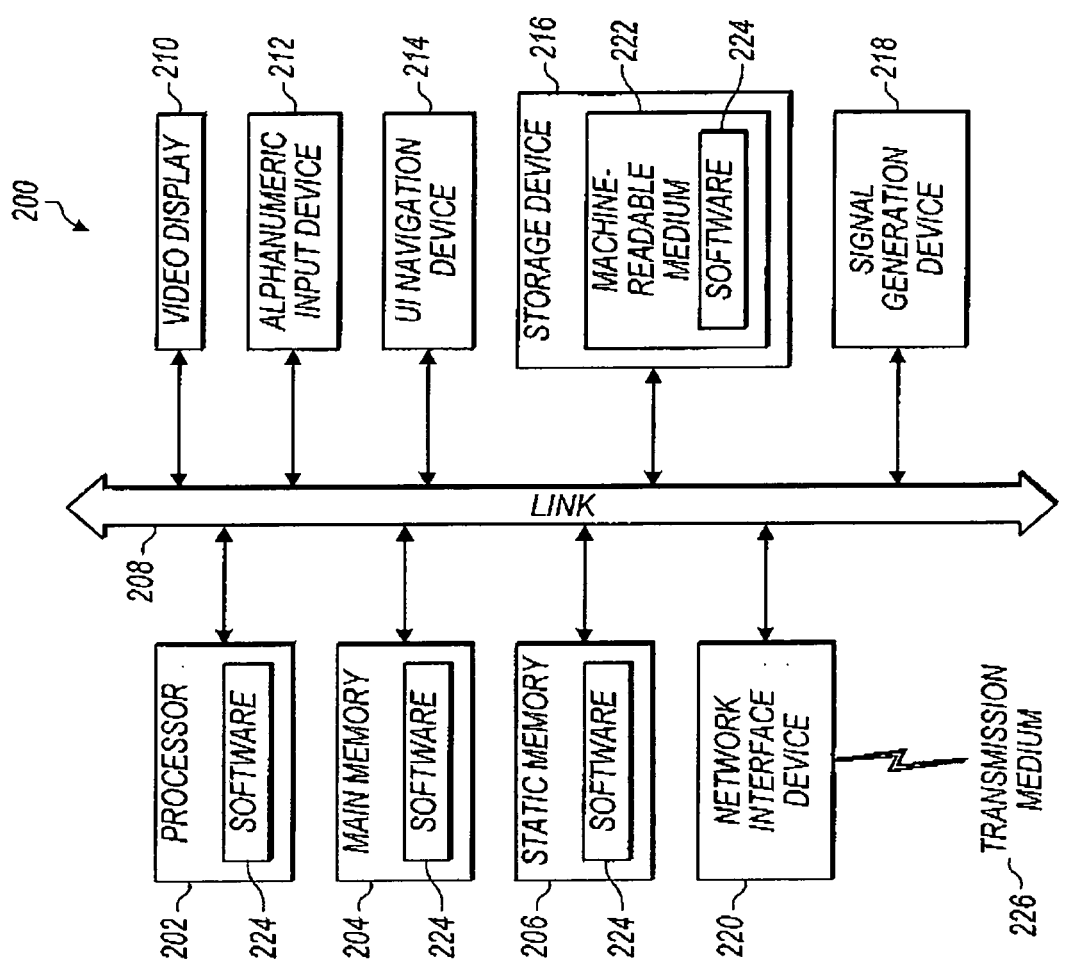
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication-based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, when a UE is connected to a radio access network (RAN), e.g., either an eNB or gNB, a number of messages may be passed between the UE and the RAN. For example, the RAN can query the UE for the UE capability when the network has no prior knowledge of the UE capability. The RAN may obtain UE capability information that may include UE capabilities associated with the RAN (RAN capabilities) and/or UE capabilities associated with the core network (CN) (CN capabilities). In various embodiments, the UE may also provide a capability ID from the UE. The capability ID may be provided along with the UE capability information or at some other point. In some embodiments, the capability ID may be provided instead of the capability information. Multiple UEs may use the same capability ID and have the same capability.

Figure 3:
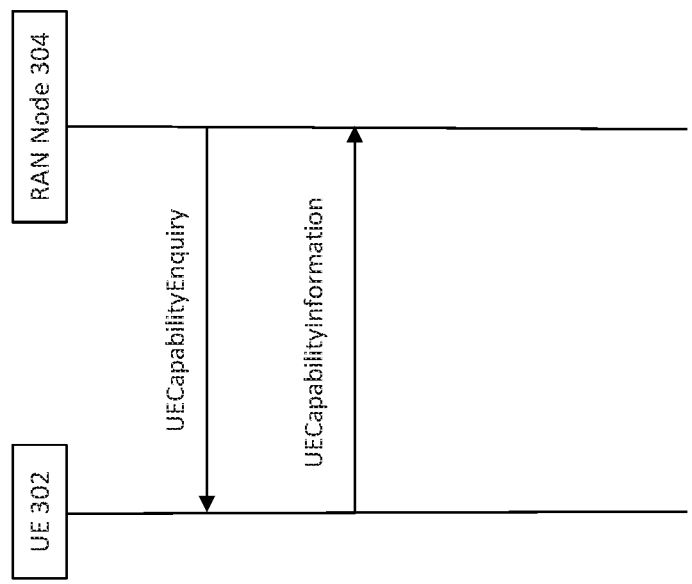
FIG. 3 illustrates UE capability transfer in accordance with some embodiments.

In more detail, the network may initiate the procedure to obtain UE capability information to a UE in RRC_CONNECTED when the network desires the UE radio access capability information. This procedure may be used every time the UE enters the CONNECTED mode. FIG. 3 illustrates UE capability transfer in accordance with some embodiments. Note that although the LTE RAN node (eNB) and core network entity (MME) are referred to generally herein, the same functionality and messaging may be used in a NR network between the 5G RAN node (gNB) and 5G core network entity (AMF). A UE Capability Enquiry message may be transmitted from a base station/RAN node (eNB or gNB) 304 to the UE 302. The UE 302 may respond with a UE Capability Information message. Both the UE Capability Enquiry message and the UE Capability Information message may be Radio Resource Control (RRC) messages.

The UE Radio Capability information may contain information on radio access technologies (RATs) that the UE supports. This information may include, for example, power class, supported frequency bands and technologies, UE category, and UL and DL carrier aggregation band combinations, among others. Initially, this process was simple and the information small, with the evolution of the network generations (LTE, 4G, 5G) however, the information transmitted has increased in size and become more complicated. The UE Radio Capability information may be larger than 50 octets for a UE supporting a small number of frequency bands or multiple kilobytes for a UE supporting many frequency bands and a large multiplicity of combinations of these frequency bands. Consequently, the UE Radio Capability information may be sufficiently large that it is undesirable to send the information across the radio interface at every transition of the UE from the ECM-IDLE state (in which the RRC connection has been released) to the ECM-CONNECTED state (in which the RRC connection has been established).

To avoid the overhead involved in sending these RRC messages, the MME may store the UE Capability information of a particular UE during the ECM-IDLE state. The MME may then, if the UE Capability information is available, send the most recent UE Radio Capability information to the E-UTRAN in the S1 interface INITIAL CONTEXT SETUP REQUEST message unless the UE is performing an Attach procedure or a Tracking Area Update procedure for the "first TAU following GERAN/UTRAN Attach" or for a "UE radio capability update".

If the UE is performing an Attach procedure or a Tracking Area Update procedure for the "first TAU following GERAN/UTRAN Attach" or for "UE radio capability update", the MME may delete (or mark as deleted) the UE Radio Capability information stored for this UE. If the MME sends an S1 interface INITIAL CONTEXT SETUP REQUEST message or UE RADIO CAPABILITY MATCH REQUEST message during the procedure, the MME may not send any UE Radio Capability information to the E-UTRAN in the above message. This may, in turn, trigger the E-UTRAN to request the UE Radio Capability from the UE and to upload the UE Capability information to the MME in the S1 interface UE CAPABILITY INFO INDICATION message.

Figure 4:
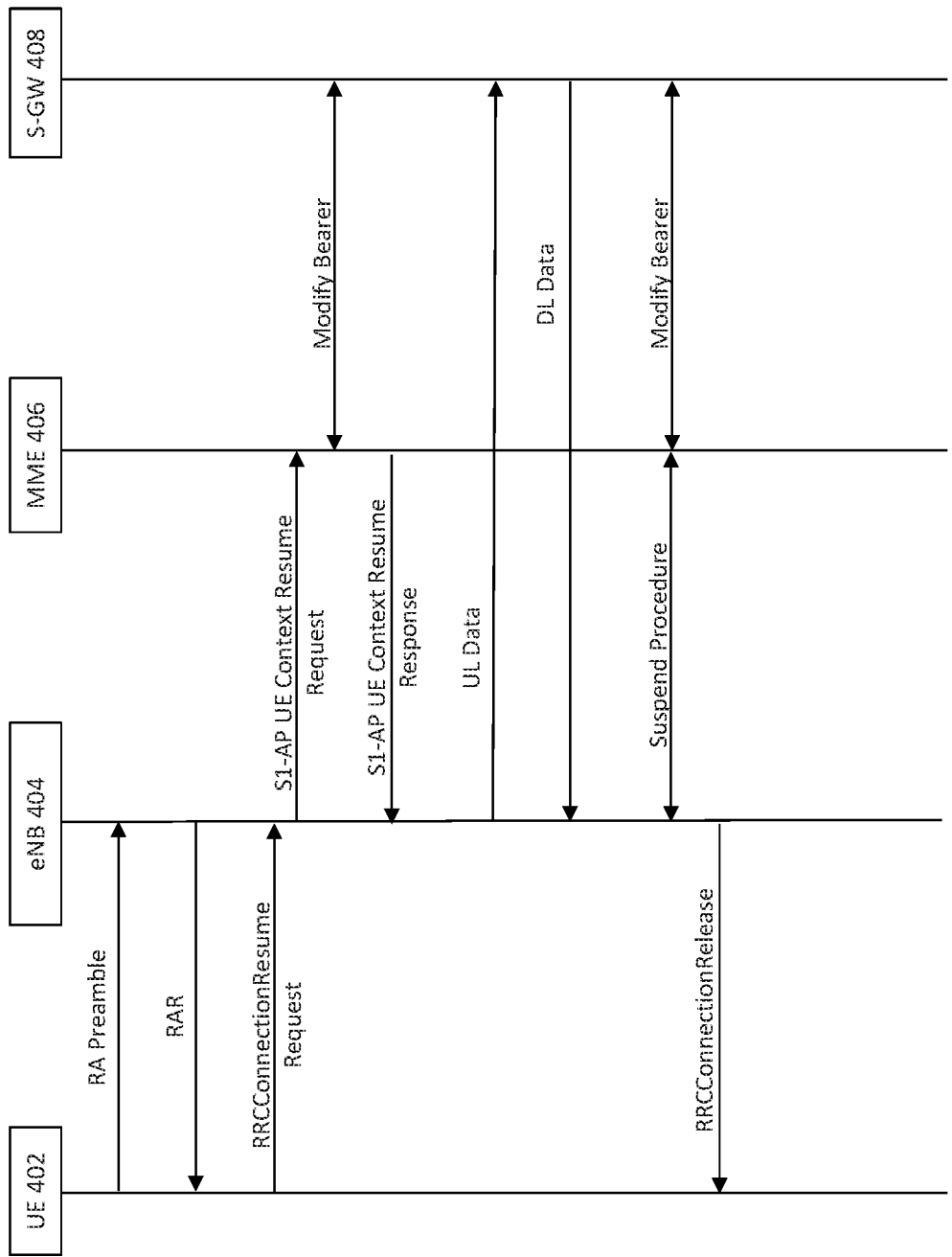
FIG. 4 illustrates a resumption procedure in accordance with some embodiments.

The UE Radio Capability information may be used either when the UE connection is resumed (from the Idle state) or during an initial attach procedure. FIG. 4 illustrates a resumption procedure in accordance with some embodiments. In particular, FIG. 4 illustrates various messages between the UE 402, the eNB 404, the MME 406 and S-GW 408. The UE 402 may send a random access channel (RACH) Request—MSG1) to the eNB 404 using a RACH resource. The RACH Request may contain a random access preamble having a preamble index, which may be randomly selected based on the size of the RRC connection request from preamble information in system information block (SIB).

The eNB 404, having received the RACH request from the UE 402 may allocate a temporary Cell Radio Network Temporary Identifier (C-RNTI) for the UE. The temporary Cell RNTI may be transmitted to the UE 402 in a RACH Response message (RAR-MSG2) from the eNB 404. The RAR message may also contain the appropriate timing advance (TA) for the UE 402, determined by the eNB 404. The RAR message may contain a scheduling grant for the UE 402 to send a RRCConnectionResumeRequest message, where the scheduling grant may indicate whether frequency hopping is to be used as well as the resource block assignment. The RAR message may further indicate the modulation and coding scheme and the power for the PUSCH to be used by the UE.

When the UE 402 receives the RAR, the UE 402 may transmit a RRCConnectionResumeRequest message (MSG3). MSG3 may be transmitted using the resources indicated by the eNB 404 in the RAR.

The eNB 404 may, in response to reception of the RRCConnectionResumeRequest message, transmit an S1-AP UE Context Resume request to the MME 406. The MME 406, in response to reception of the S1-AP UE Context Resume request, may engage in a modify bearer procedure with the serving gateway (S-GW) 408 to modify the bearer context of the UE 402 before responding to the eNB 404 with a S1-AP UE Context Resume response.

Once the bearer(s) for the UE 402 has been established, the eNB 404 may transmit UL data to the S-GW 408 and receive DL data from the S-GW 408. The data transfer may continue until the eNB 404 suspends the UE connection, engaging in a suspend procedure with the MME 406, which again engages in a modify bearer procedure with the S-GW 408 to modify the bearer context of the UE 402. After the bearer has been suspended, the eNB 404 may send an RRCConnectionRelease message (MSG4) to the UE 402.

Figure 5:
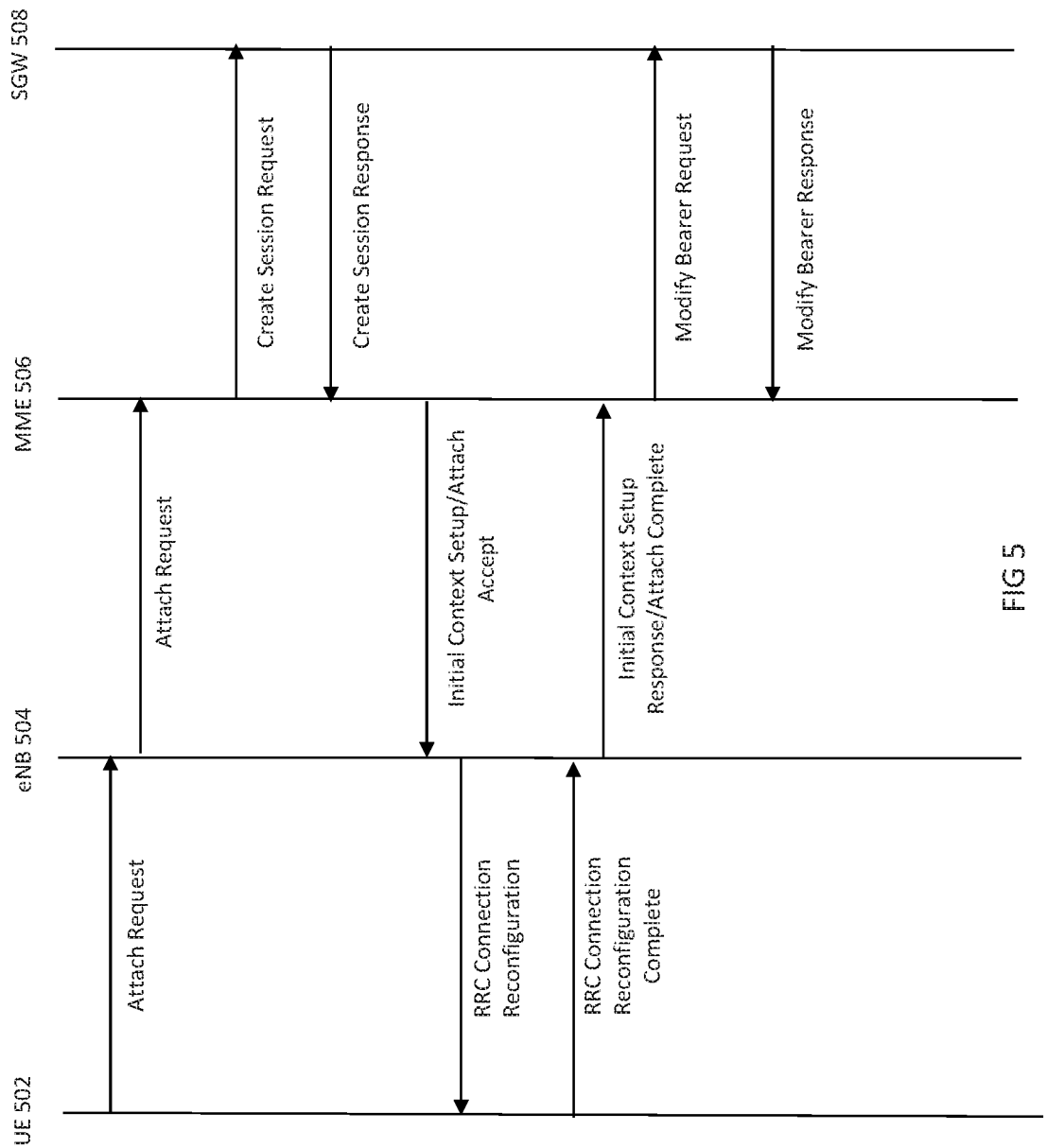
FIG. 5 is a flowchart of an Attach procedure in accordance with some embodiments.

FIG. 5 is a flowchart of an Attach procedure in accordance with some embodiments. FIG. 5 illustrates a simple case in which the Attach procedure does not involve an MME change, i.e., the UE re-attaches to the same MME from which it detached before. The Attach procedure may be used to attach a UE to an EPC for a packet service of the EPC. The Attach procedure can be used when a UE attaches to an EPS service and/or non-EPS service or for emergency bearer services.

An EMM-deregistered UE 502 initiates the Attach procedure by transmitting an Attach Request message to the eNB 504 and RRC parameters indicating the selected network and the Globally Unique Mobility Management Entity Identifier (GUMMEI) of the MME 506. The Attach Request message may include UE identity information, e.g., a Globally Unique Temporary Identifier (GUTI). The UE sets the voice domain preference and UE's usage setting according to its configuration. The last visited Tracking Area Indicator (TAI) may also be included to help the MME 506 produce a list of TAIs for subsequent Attach Accept messages. The Attach Request may have an Attach Type and Request Type that may be useful for Emergency Attach Requests.

The eNB 504 may determine the MME 506 from the RRC parameters and then forward the Attach Request message to the MME 506 contained in an S1-MME control message Initial UE Message along with other information such as the selected network, a Closed Subscriber Group (CSG) access mode, a CSG ID, and TAI+ECGI of the cell from where the Attach Request message was received.

The MME 506 may then transmit a Create Session Request to the SGW 508. This may be used by the SGW 508 to establish the EPS bearers with the PDN GW (not shown) for communication with the UE 502. The SGW 508 may respond with a Create Session Response to the MME 506 after the EPS bearers have been set up with the PDN GW.

When the Attach Request is granted in the corresponding network, the MME 506 may transmit an Attach Accept message to the eNB 504. This message is contained in an S1_MME control message Initial Context Setup Request, that may also include other information used by the UE in establishing attachment, such as security context information, EPS Bearer QoS and Identity, and address of the SGW 508. In addition, the MME may provide information for instructing the UE to perform EPS bearer context activation to the UE. The MME 506 may also respond to the Attach Request message with an Attach Reject message, along with the appropriate cause for the rejection to the UE 502.

Upon reception of the Attach Accept message from the MME 506 the eNB 504 sends an RRC Connection Reconfiguration message including the EPS Radio Bearer Identity to the UE 502 in addition to the Attach Accept message. In response, the UE 502 may transmit an RRC Connection Reconfiguration Complete message to the eNB 504. The eNB 504 then transmits an Initial Context Response message to the MME 506 containing, among others, the address of the eNB 504 used for downlink traffic on the S1_U reference point. The UE 502 may also transmit Attach Complete message to the MME 506 via the eNB 504. The Attach Complete message may be transmitted separately from the Initial Context Response message.

The MME 506, after receiving the Attach Complete message and the Initial Context Response message, may send a Modify Bearer Request message to the S-GW 508. The S-GW 508 may communicate with the PDN GW if handover from non-3GPP to 3GPP access is to occur at this point. The SGW 508 may respond to the Modify Bearer Request message by sending a Modify Bearer message to the MME 506. The S-GW 508 can then send any buffered downlink packets for the UE 502.

The size of the UE Radio Capability information may be greater than can be carried in a single RRC message but less than the maximum size of messages on the S1 interface. In this case, to obtain the information used by the RAN, the RAN may send multiple requests to the UE for different subsets of the UE Radio Capability information. Generally, the RAN may send one request per RAT. The RAN may then combine the subsets (excluding UTRAN and NB-IoT capabilities) into a single UE Radio Capability IE and upload the UE Radio Capability IE to the MME in the S1 interface UE CAPABILITY INFO INDICATION message.

The MME may store the UE Radio Capability information. The MME may include the UE Radio Capability IE in further INITIAL CONTEXT SETUP REQUEST or UE RADIO CAPABILITY MATCH REQUEST messages in cases other than an Attach procedure, a Tracking Area Update procedure for the "first TAU following GERAN/UTRAN Attach" and "UE radio capability update" procedure.

If the UE is performing a Service Request (or other) procedure and the MME does not have UE Radio Capability information available (or the UE Radio Capability information is available, but marked as "deleted"), then the MME may send an S1 interface INITIAL CONTEXT SETUP REQUEST message to the E-UTRAN without any UE Radio Capability information in it. This may trigger the E-UTRAN to request the UE Radio Capability from the UE and upload the UE Radio Capability to the MME in the S1 interface UE CAPABILITY INFO INDICATION message.

This use of the INITIAL CONTEXT SETUP REQUEST message means that for a signaling-only procedure, such as a periodic Tracking Area Update, the UE Radio Capability would not be sent to the E-UTRAN. During handover via the MME (both intra RAT and inter RAT), the radio capability information for the source and target 3GPP RATs (with the possible exception of UTRAN and E-UTRAN) are transferred in the "source to target transparent container". Information on additional 3GPP RATs may be optionally transferred in the "source to target transparent container".

At handover, transfer of the radio capability information related to the source and/or additional RATs may be beneficial as such information avoids retrieval by the target RAT of the information from the UE prior to a subsequent inter-RAT handover. However, there may be situations where the size of the UE Radio Capability may be too large for the information on all of the UE's RATs to be carried in a single message on one or more of the network interfaces involved in the handover. Hence, the source RAN may ensure that the size of the UE Radio Capability information does not cause the size of the "source to target transparent container" to exceed the limits that can be handled by interfaces involved in the handover (e.g., the Iu interface (3GPP TS 25.413) and, following Single Radio Voice Call Continuity (SRVCC), the E interface (3GPP TS 29.002)).

This may result in some radio capability information being omitted from the "source to target transparent container" at inter-RAT handover. In this situation, the UE may be subject to an inter-RAT handover to E-UTRAN via the MME which has the context stored for that UE. The MME may detect that the "source to target transparent container" is smaller than the UE Radio Capability stored in that UE's context. The MME may then add the full UE Radio Capability as a standalone Information Element (IE) in the S1-AP Handover Request message. The eNB may use this MME-supplied information to avoid retrieving any missing UE Radio Capability Information from the UE.

In the case that a source RAN node omits some radio capability information from the "source to target transparent container" at handover, the source RAN node may ensure that any future target RAN node can detect that that radio capability information has been omitted.

The UE capability content size that the NR UE can report is, however, much larger than that of LTE capability size. In this case, it may be desirable to provide the UE capabilities 'offline' to the networks, thereby reducing the use of the air-interface by the UE to transfer the UE capability.

In one embodiment, the model identification (ID) from the Type Allocation Code (TAC) part of the International Mobile Equipment Identity (IMEISV) may reflect the capabilities of all the UEs that are manufactured and assigned with this TAC. This can reduce the core network storage requirements, as the core network only stores the capabilities for the corresponding TAC, instead of doing so for every UE. However, if the core network does not have the capabilities corresponding to the model ID based on the TAC, then the UE may resort to transmitting the capabilities using the air interface. These capabilities may then be updated in the core network using the model ID provided by the UE.

Moreover, since a particular ID now represents a group of UEs, if the network has the capability for the ID, then all the UEs with the same ID are implicitly assumed to have the same capabilities. Consequently, if the capabilities are incorrect (or modified), this can create a misconfiguration between what the network and UE assume the UE capabilities are.

In typical LTE networks only about 15 to 20 different UE models account for 50% of the UE population. This also implies that if the UE manufactures and/or the operators provide the capabilities of the UE to the core network for the models that are intended to be released for commercial use, and assign a unique ID to this capability set, then the UE can just provide this ID and expect the core network (CN) to retrieve the capabilities corresponding to this ID. In particular, a network element such as an MME or AMF may supply this information. This may also be an effective solution considering that the updates used by the UE manufacturer or the operator are relatively infrequent. And if the ID is model based, then a group of UEs which share the same model can use the capability, which would reflect the actual operator or the UE manufacturer intended capability.

At the production stage of the UE, the UE may be assigned the capability ID, which the UE may use to report on behalf of the capabilities. This capability ID may be based on the UE device type, manufacturer and the software version. All UEs with the same device type, manufacturer and the same software version having the capability may have the same capability ID. Conversely, if the access stratum capability of a UE is different, the capability ID may be different.

Following the above, in the case of a software update to the group of UEs that are of the same device type from the same manufacturer, the different software version may result in a different capability ID. The UEs may be updated with the new capability ID as part of the software update, and the manufacturer or the operator may also update the corresponding new capabilities offline to the core network.

With a software update, the different software version even for the UEs with the same manufacturer and the same model may result in a different capability ID. The UE manufacturer or the operator may provide the capabilities to the core network that correspond to the new capability ID resulting from software update. The capabilities provided to the core network can be different or the same as the ones before the update.

The authentication and security in NR may be based on the universal subscriber identity module (USIM) and not the IMEI. A UE implementation (potentially without a legal IMEI) can insert a valid and authenticated USIM, register legally with the network and provide a different set of capabilities to the network using the ID. However, if the network stores the provided capabilities using this ID, this can 'overwrite' the capabilities of all the UEs that use this ID.

If the capabilities are provided by the manufacturer or the operator to the core network offline, then the network may avoid updating the capabilities for an ID using the UE-provided capabilities. This can prevent potential security issues related to overwriting of the capabilities. In addition, if the network is not able to retrieve the capabilities corresponding to the UE provided ID, the UE can fall back to providing its capability using the legacy procedure. In this case, the network may avoid associating the capabilities of the UE to any particular ID, thereby avoiding the security threat.

As above, the UE may provide the capability and an associated capability ID that can be re-used by all the other UEs having the same capability ID. However, the use of the same ID may risk that a fraudulent or misbehaving UE providing the capability ID may be able to corrupt the capability of other UEs having the same capability ID. In this case, the network can query the UE capability as before when the network has no prior knowledge of the UE capability. The UE may in response provide the capability and capability ID. The capability ID may be provided along with the capability or at some point earlier. The network may store this capability against the capability ID and mark the capability as "not validated". When another UE provides the same capability ID, and the capability associated with the capability ID is not validated, the network may query the capability from this UE as well. This process may be repeated a number of times and each time the capability provided by the UEs may be compared with each other. When a predetermined number of UEs provide the same capability, the network can confirm the UE capability is valid. The UE capability ID can also be retrieved again after security association with the UE for added security protection. The above "self-learning" procedure may not use any administrative overhead. Nor does the procedure employ significant changes to specifications and UE implementations.

As the capability ID provided by the UE is intended to implicitly provide the capabilities the UE intended to transfer, then ideally it would be desirable for the UE to transfer the capability ID as soon as possible; i.e., when the UE enters the Connected mode. During the transition from the Idle mode to Connected mode, the message used to initiate a random access channel (RACH) procedure, MSG1, may be purely a preamble sequence with no RRC information. Thus, MSG1 may be unlikely to be used to send the capability ID.

In some embodiments, the gNB can cache the UE capabilities (based on the UE provided capability ID), and in such cases, sending the capability ID at MSG3 itself can potentially help with setting up of SRB1 and other access stratum capabilities faster. The UE may transmit a RRCConnectionResumeRequest message in a physical uplink control channel (PUCCH) as MSG3 after reception of a UL grant in a random access response (RAR) from the network. However, any addition to MSG3 may impact negatively on the cell coverage. To avoid this, the capability ID transmission by the UE may be deferred to MSG5 (RRCSetupComplete message that contains an ACK of the PDCCH with UL grant).

The UE context, including the capability information, may be maintained in the RAN while the UE is in the INACTIVE state. While the case where the capability is changed is discussed below, in cases in which the capability remains the same, the UE may not provide the capability ID at RRC resumption.

To address the case where the UE capability has the potential to change while the UE is INACTIVE state, the UE may 'release' the connection and establish a new one if the UE capabilities have changed while the UE is in connected mode. Based on this, if the UE's capability has changed during the RRC INACTIVE state, the UE can initiate a new RRC Setup Request, thereby also allowing the setup of a new N2 interface, which can the provide the gNB with the latest UE-intended capabilities from the AMF. Thus, using the combination of the NAS registration procedure and RRC connection establishment procedure may sufficient for transferring of a capability (with the capability ID using the new approach).

In this case, the capability ID transfer may be done with the RRCSetupComplete message as MSG5 when used at initial Attach or NAS registration involving change of AS capability. In some cases, the capability ID can be provided in NAS signaling rather than the RRC signaling as: the AMF is the main repository for the UE capability content as well as the capability ID that refers to this content (even when gNB can cache the capability if it intends to), and since the gNB gets the UE capability for an capability ID from AMF, the capability ID would be used at the AMF anyway; and if the UE intends to provide a new capability to the network due to a UE capability change, the UE may use the NAS signaling to inform the AMF to 'release' the earlier capability. A capability change using the new procedure may merely mean a change of capability ID; thus the capability ID may be added for this case to the existing NAS signaling.

Both the NAS and RRC approaches may be viable. It may appear that adding the capability ID in NAS signaling can make the gNB be agnostic to the capability ID transfer and that AMF may provide the capability that corresponds to the ID, using the existing N2 setup signaling, which can lead to minimal changes.

However, for RRC signaling, using the ID-based approach, the gNB may have the potential to cache the capability ID and corresponding capability. This caching can be the basis in the reduction of the CN/RAN signaling of capability. Moreover, the gNB may be able to determine the capability of the UE faster, which can be used to configure access stratum parameters earlier while the N2 is being set up. Signaling of the ID using RRC signaling may be simpler for the RRC to know of the ID provided by the UE. Also, the gNB may 'push' the information of the capability of the UE (and the corresponding ID) to AMF; the gNB may know the ID from NAS signaling otherwise. Moreover, in the future, if the capability ID-based capability transfer is to be used in other RATs, having the transfer between the UE and eNB/MME etc. using the RRC messaging of the corresponding RAT can lay the platform for RAT-specific unique exchanges from the UE to the network (rather than having to use the NAS signaling). Note that the capability ID transfer can also occur in UECapabiltyResponse message, which is an RRC message.

Irrespective of how capability ID is created, the network may use the actual capability that the capability ID maps to, and in some cases, this may be provided by the UE. To handle this situation, the UE may provide the capability ID along with the associated capability; the UE capability enquiry and information response procedure may be extended to accommodate this.

The existing UE capability enquiry message/information response procedure can accommodate the transfer of additional signaling used to handle the UE capability ID-based transfer feature. In addition, the gNB or other network nodes may not have the capability ID or the corresponding capabilities based on the capability ID (at least in some transient situations). In cases where there is no (sufficient) information on the capability ID or the capability ID refers to, it may be useful to ensure that the capability from the UE is transferred to the network, and in such cases the legacy means of capability transfer can be re-used.

In addition, the case of UE transferring partial capability based on network-provided filters (network requested bands, bandwidth etc . . . ) may be addressed with regard to how this mixes with capability ID based capability transfer. The basic premise with capability ID usage is that the ID intends to replace the transfer of UE capability across the UE and gNB and possibly across the network nodes. And as stated above, the legacy means of capability transfer using UECapabilityEnquiry and UECapabilityInformation may also be used.

Although it would be not effective for the network to ask again via legacy means, after the UE has sent the capability ID and the network has the capability information based on the capability ID, from UE perspective, this use case is not different from the case where the network could not map the capability from the ID earlier, and the network had asked for the capability (with some filters provided). In a sense both the capability ID-based capability transfer and the legacy capability transfer can co-exist, though redundant and perhaps at the discretion of the gNB. In some cases, the gNB may not be prevented from asking for a filtered UE capability using legacy means, even after the UE has provided a capability ID in MSG5 earlier.

The legacy process of capability transfer and the capability ID based capability transfer may not be mutually exclusive. The legacy capability transfer usage may include (but not be limited to) cases where: the network nodes do not have information on the capability ID or the capability that is referred to by the capability ID, the UE does not provide a capability ID to the network, or if the network intends to use the legacy procedure.

The legacy messages UECapabilityEnquiry and UECapabiiltyInformation can be enhanced to handle the transfer of UE capability ID and the associated UE capability message. The UECapabilityEnquiry message may thus include an optional request from the network to provide the UE capability ID (even if the UE has provided the UE ID earlier). The UECapabilityInformation message may in response include an optional UE capability ID field that the UE fills in if the UE has a UE capability ID and the ID is requested by the network. The capability provided in the UECapabilityInformation message may be assumed to be the capability the capability ID message represents in such a case.

As is clear, although the above embodiments primarily describe UE capability information with regard to the RAN capability information, similar methodology may be used for the CN capability information in either LTE or NR networks. Thus, for example, the eNB may obtain the UE capabilities either from the UE (via the UE Capability Enquiry message) or from the MME, dependent on whether the UE capabilities are stored in the MME, as the eNB does not store the UE capabilities. The eNB may obtain the UE capabilities every time UE enters the Connected mode. The eNB may send the UE capability (which includes RAN and CN capabilities) to the CN when the UE enters the Idle mode. When the UE detaches from the eNB, the CN may clear the stored UE capabilities. However, instead of the UE always providing the UE capabilities to the eNB during attach or upon a change of capabilities occurring (detaching and reattaching to clear the capability), the UE may merely send the capability ID. If the CN does not have UE capability stored, the CN may indicate to the eNB to send the UE Capability Enquiry message. As above, the CN can then take measures the ensure that the capability ID is not corrupted (e.g., either using a threshold number of UEs having the same UE capability associated with the capability ID or via an integrity checksum, for example). Note that the capability ID may be sent by the UE in any UL RRC message, such as the RRC Setup Complete message including the contained NAS message, the RRC Security Mode Complete message (used to confirm the successful completion of a security mode command), the RRC Reconfiguration Complete message, or in the UE capability information message. The capability ID and the corresponding UE capability information may be transmitted to the network element (MME/AMF) offline—e.g., via O&M, directly from a network operator, or from a central repository.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
   at least one processor configured to cause a user equipment (UE) to:
   determine whether UE Capability Information is to be transmitted to an access and mobility management function (AMF);
   in response to a determination that the UE Capability Information is to be transmitted to the AMF, encode, for transmission to the AMF, a control message comprising a capability identifier (ID) that is associated with a plurality of UEs;
   determine a change in UE capability; and
   in response to determining the change in UE capability, encode, for transmission to the AMF, a new capability ID.

2. The apparatus of claim 1, wherein the at least one processor is further configured to engage in non-access stratum (NAS) registration involving a change of access stratum capability, the control message being NAS signaling.

3. The apparatus of claim 1, wherein the at least one processor is further configured to:
   decode to a UE Capability Enquiry message from a radio access network (RAN) node; and
   in response to reception of the UE Capability Enquiry message, encode a UE Capability Information message to the RAN node comprising the capability ID.

4. The apparatus of claim 3, wherein:
   the UE Capability Enquiry message includes a field that contains an indication for the UE to provide the capability ID, and
   the UE Capability Information message includes a UE capability ID field that contains the capability ID if the ID field of the UE Capability Enquiry message contains the indication.

5. The apparatus of claim 1, wherein the at least one processor is further configured to:
   decode a UE Capability Enquiry message from a radio access network (RAN) node;
   encode, for transmission to the RAN node in response to reception of the UE Capability Enquiry, a UE Capability Information message: and
   encode, for transmission to the RAN node, the capability ID in a message separate from the UE Capability Information message.

6. The apparatus of claim 1, wherein the capability ID is based on a UE device type, manufacturer and software version.

7. The apparatus of claim 1, wherein said determining the change in UE capability is performed while the UE is in a radio resource control (RRC) inactive state; and
   wherein the new capability ID is provided during a non-access stratum (NAS) registration procedure.

8. The apparatus of claim 7, wherein the at least one processor is further configured to:
   in association with the NAS registration procedure, perform an RRC connection establishment procedure initiated by an RRC Setup Request.

9. The apparatus of claim 1, wherein said determining the change in UE capability is based on a software update of the UE.

10. The apparatus of claim 1, wherein the capability ID is based on an access stratum capability of the UE.

11. A non-transitory computer accessible memory medium storing program instructions executable by one or more processors of a user equipment (UE) to:
- determine whether UE Capability Information is to be transmitted to an access and mobility management function (AMF);
- in response to a determination that the UE Capability Information is to be transmitted to the AMF, encode, for transmission to the AMF, a control message comprising a capability identifier (ID) that is associated with a plurality of UEs;
- determine a change in UE capability; and
- in response to determining the change in UE capability, encode, for transmission to the AMF, a new capability ID.

12. The non-transitory computer accessible memory medium of claim 11, wherein the program instructions are further executable to:
- engage in non-access stratum (NAS) registration involving a change of access stratum capability, the control message being NAS signaling.

13. The non-transitory computer accessible memory medium of claim 11, wherein said determining the change in UE capability is performed while the UE is in a radio resource control (RRC) inactive state; and
- wherein the new capability ID is provided during a non-access stratum (NAS) registration procedure.

14. The non-transitory computer accessible memory medium of claim 13, wherein the program instructions are further executable to:
- in association with the NAS registration procedure, perform an RRC connection establishment procedure initiated by an RRC Setup Request.

15. The non-transitory computer accessible memory medium of claim 11, wherein said determining the change in UE capability is based on a software update of the UE.

16. A user equipment (UE), comprising:
wireless communication circuitry; and
at least one processor coupled to the wireless communication circuitry, wherein the at least one processor is configured to:
- determine whether UE Capability Information is to be transmitted to an access and mobility management function (AMF);
- in response to a determination that the UE Capability Information is to be transmitted to the AMF, encode, for transmission to the AMF, a control message comprising a capability identifier (ID) that is associated with a plurality of UEs;
- determine a change in UE capability; and
in response to determining the change in UE capability, encode, for transmission to the AMF, a new capability ID.

17. The UE of claim 16, wherein at least one processor is further configured to:
- engage in non-access stratum (NAS) registration involving a change of access stratum capability, the control message being NAS signaling.

18. The UE of claim 16, wherein said determining the change in UE capability is performed while the UE is in a radio resource control (RRC) inactive state; and
- wherein the new capability ID is provided during a non-access stratum (NAS) registration procedure.

19. The UE of claim 18, wherein at least one processor is further configured to:
- in association with the NAS registration procedure, perform an RRC connection establishment procedure initiated by an RRC Setup Request.

20. The UE of claim 16, wherein the capability ID is based on a UE device type, manufacturer and software version.

* * * * *